UNITED STATES PATENT OFFICE.

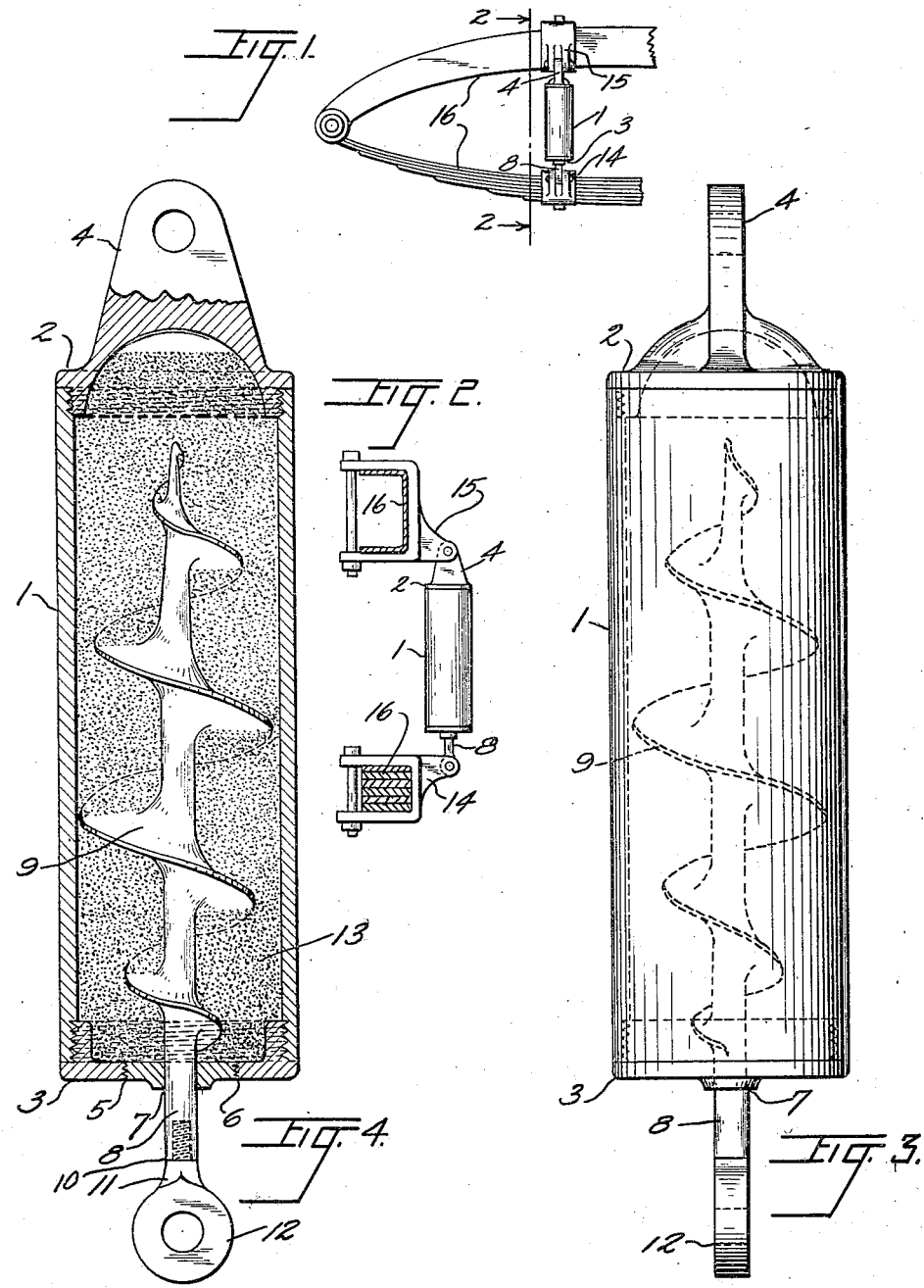

JOHN N. HOVAS, OF CHICAGO, ILLINOIS.

SHOCK-ABSORBER.

1,269,606.  Specification of Letters Patent.  Patented June 18, 1918.

Application filed October 3, 1917. Serial No. 194,485.

*To all whom it may concern:*

Be it known that I, JOHN N. HOVAS, a citizen of the United States, residing at Chicago, in the county of Cook and State of Illinois, have invented certain new and useful Improvements in Shock-Absorbers, of which the following is a specification.

This invention relates to improvements in shock absorbers and its prime object is to provide a device of this class that is very simple in construction, efficient in operation and cheap to manufacture and that is adapted particularly for use upon automobiles although it will be found applicable to a variety of other uses. In use upon automobiles the device is adapted for attachment to the automobile springs to increase the resiliency of the same. More specifically the invention consists in the combination and arrangement of parts to be hereinafter fully described, pointed out in the appended claims and illustrated in the accompanying drawing which forms a part of this specification and in which—

Figure 1 is a view of my improved shock absorber in elevation illustrating its application.

Fig. 2 is an enlarged view taken on line 2—2 of Fig. 1.

Fig. 3 is an enlarged view of the shock absorber proper in elevation.

Fig. 4 is a vertical sectional view of Fig. 3.

Like reference characters denote corresponding parts throughout the several views.

My shock absorber comprises a hollow casing 1 preferably of cylindrical formation and threaded interiorly at its extremities to receive the screw caps 2, 3, the former being formed with a flattened apertured rib 4 and the latter, or cap 3, being formed with a threaded central perforation 5 to receive the threaded plug 6 formed with a central aperture 7 to receive the shank 8 of the spirally formed plunger 9 removably arranged within the said casing 1. One end of the shank 8 is formed with a threaded socket 10 adapted to receive the threaded stem 11 of the screw-eye 12. The spiral plunger 9 is introduced into the casing 1 or removed therefrom after the cap 2 has been removed and the screw-eye disengaged from the socket 10 of shank 8.

Within the casing 1 I provide a filler of granular matter, preferably sand 13 in which the said plunger 9 is buried, the sand serving as an absorber to take all jolt administered to the said plunger or to the casing 1. Clamps 14, 15 are secured to the rib 4 and screw-eye 12 and to the leaves of the body spring 16. It is evident that all jolt incident to vibration of the said spring due to travel of the vehicle over rough roads, etc., will be absorbed by my improved device thus giving the vehicle an easy-riding action.

What is claimed is:—

1. In a shock absorber, a container, a spiral plunger within said container and formed with a shank projected beyond said container, and a filler of granular material within said container.

2. In a shock absorber, a container, a spiral plunger within said container and formed with a shank projected beyond said container, and a filler of granular material within said container and serving as a packing for said spiral plunger.

3. In a shock absorber, a container, a spiral plunger within said container, said plunger being formed with a shank projected beyond said container, a filler of granular material within said container and serving as a packing for said spiral plunger, and supporting means engaging said container and shank.

4. In a shock absorber, a container, a spiral plunger within said container and formed with a shank projected beyond said container, said shank being terminally formed with a socket, a screw-eye adapted for releasable engagement with the socket of said shank, a filler of granular material within said container and serving as a packing for said spiral plunger, and supporting means engaging said container and screw-eye.

5. In a shock absorber, a capped container, one cap of said container being partly flattened to form a rib, a plug fitted to the other cap, a spiral plunger within said container and formed with a shank projected therebeyond, a filler of sand for said container and serving as a packing for said spiral plunger, and supporting means engaging said container and plunger-shank.

6. In a shock absorber, a cylindrical container, terminal caps for said container, a spiral plunger within said container formed with a shank projected through one of said caps, a filler of granular material within said container serving as a packing for said spiral plunger, and supporting means engaging said container and shank.

In testimony that I claim the foregoing as my own I have hereto affixed my signature in the presence of two subscribing witnesses.

JOHN N. HOVAS.

Witnesses:
GRACE C. THOMPSON,
D. D. SWEM.

Copies of this patent may be obtained for five cents each, by addressing the "Commissioner of Patents, Washington, D. C."